(12) United States Patent
Cunningham

(10) Patent No.: US 8,333,228 B1
(45) Date of Patent: Dec. 18, 2012

(54) TIRE CHANGER WITH ATTACHED INFLATION CAGE

(75) Inventor: Charles L. Cunningham, Nashville, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 385 days.

(21) Appl. No.: 12/574,766

(22) Filed: Oct. 7, 2009

Related U.S. Application Data

(60) Provisional application No. 61/105,681, filed on Oct. 15, 2008.

(51) Int. Cl.
*B60C 25/00* (2006.01)
*B60C 25/05* (2006.01)

(52) U.S. Cl. .......................................... 157/1
(58) Field of Classification Search ............. 157/1, 14, 157/15
See application file for complete search history.

(56) References Cited

U.S. PATENT DOCUMENTS

| | | | |
|---|---|---|---|
| 4,245,686 A | | 1/1981 | Holladay |
| 4,381,027 A | * | 4/1983 | Molen et al. ............ 157/1 |
| 4,505,309 A | * | 3/1985 | Adelman et al. ............ 141/97 |
| 4,538,659 A | * | 9/1985 | Adelman et al. ............ 157/1 |
| D293,916 S | | 1/1988 | Cunningham et al. |
| 4,742,859 A | * | 5/1988 | Mannen ............ 157/1 |
| 5,623,981 A | | 4/1997 | Cunningham et al. |
| 5,752,555 A | | 5/1998 | Cunningham et al. |
| 5,941,294 A | | 8/1999 | Cunningham et al. |
| 6,109,327 A | | 8/2000 | Gonzaga |
| 6,173,751 B1 | | 1/2001 | Magnani |
| 6,182,736 B1 | | 2/2001 | Cunningham et al. |
| 6,192,959 B1 | | 2/2001 | Spaggiari |
| 6,276,422 B1 | | 8/2001 | Rino |
| 6,408,921 B1 | | 6/2002 | Bonacini |
| 6,422,285 B1 | | 7/2002 | Gonzaga |
| 6,443,206 B1 | | 9/2002 | Bonacini |
| 6,470,923 B1 | * | 10/2002 | Gonzaga ............ 141/38 |
| 6,588,478 B2 | | 7/2003 | Vignoli |
| 6,761,061 B2 | | 7/2004 | Corghi |
| 7,089,987 B2 | | 8/2006 | Gonzaga |
| 7,343,955 B2 | | 3/2008 | Cunningham |
| 7,438,109 B2 | | 10/2008 | Cunningham |
| 2003/0084977 A1 | | 5/2003 | Gonzaga |
| 2003/0131947 A1 | | 7/2003 | Magnani |
| 2003/0150565 A1 | | 8/2003 | Gonzaga |
| 2004/0182520 A1 | | 9/2004 | Spaggiari |
| 2004/0221964 A1 | | 11/2004 | Bonacini |

\* cited by examiner

*Primary Examiner* — David B Thomas
(74) *Attorney, Agent, or Firm* — Waddey & Patterson, P.C.; Mark J. Patterson; Matthew C. Cox

(57) ABSTRACT

A tire changing machine comprises a chassis base and a rotatable wheel holder configured to retain a wheel rim. A tower, carrying a mount/demount head movable toward and away from the wheel rim, extends upward from the chassis base. An inflation cage is fixed with respect to the chassis base. The inflation cage defines an interior accessible through a first opening for ingress and egress of a vehicle wheel. Preferably, the inflation cage may be located at a back of the tire changer to rest on a common floor surface with the chassis base.

18 Claims, 5 Drawing Sheets

TIRE CHANGER WITH ATTACHED INFLATION CAGE

PRIORITY CLAIM

This application claims the benefit of provisional application Ser. No. 61/105,681, filed Oct. 15, 2008, which is relied upon and incorporated herein by reference.

BACKGROUND OF THE INVENTION

The present invention relates generally to tire changers.

Tire changers are utilized by employees of a vehicle service center when it is necessary to remove a tire from its rim and replace it with a new one. After the tire is replaced, the wheel is inflated by the operator. Some manufacturers of tire changers have devised various means to restrain the tire during inflation.

For example, some rim holding tire changers include swing over arm devices to help in restraining the tire/rim assembly. In other cases, a separate mechanical device has been utilized that the user inserts through the center hole of the wheel and locks into a mechanical system on the tire changer machine. Other manufacturers have provided systems in which the operator is located behind bars for the inflation stage of tire service. This system has had limited success as the operators do not want to move to a different location for tire inflation. Also, during a tire explosion, a tire and rim can be propelled upward and can do other damage.

A different way to handle tire inflation and provide more positive protection to the user is to have a 4-Bar cage or similar device. Such an arrangement will contain a tire failure or explosion. These devices, however, have drawbacks in that many times the cage devices are not firmly and structurally attached to the floor. As a result, they may become a flying object in the event of a tire explosion. Another drawback is the productivity lost when the operator moves from the tire changing machine to place the tire to be inflated in the 4-Bar cage arrangement.

SUMMARY OF THE INVENTION

The present invention recognizes and addresses the foregoing disadvantages, and others, of prior art constructions and methods.

In accordance with one aspect, the present invention provides a tire changing machine comprising a chassis base and a rotatable wheel holder (e.g., turntable) configured to retain a wheel rim. A tower carrying a mount/demount head movable toward and away from the wheel rim, extends upward from the chassis base. An inflation cage is fixed with respect to the chassis base. The inflation cage defines an interior accessible through a first opening for ingress and egress of a vehicle wheel.

Preferably, the inflation cage may be located at a back of the tire changer to rest on a common floor surface with the chassis base. For example, the inflation cage may be attached to the tower such as by a plurality of U-bolts extending around the tower.

In some exemplary embodiments, the inflation cage may have first and second openings at opposite ends thereof for ingress and egress of the vehicle wheel. Such embodiments may utilize first and second wheel ramps at the first and second openings, respectively. The first and second wheel ramps may be in alignment but have a gap defined therebetween to provide a rest position for the wheel.

It will often be desirable to form the inflation cage by a plurality (e.g., four) of vertical bars spaced apart from one another. Such vertical bars, for example, may have a generally rectangular C-shaped configuration and may be attached to a back panel to define the cage interior.

Embodiments are contemplated in which the tire changing machine further comprises an automatic inflation device. For example, the automatic inflation device may be attached to the inflation cage.

In accordance with another aspect, the present invention provides a tire inflation cage comprising a cage structure defining an interior in which a vehicle wheel is located during inflation. The interior is accessible through a first opening for ingress and egress of the vehicle wheel. An attachment mechanism by which the cage structure is attached to the tire changer is also provided.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
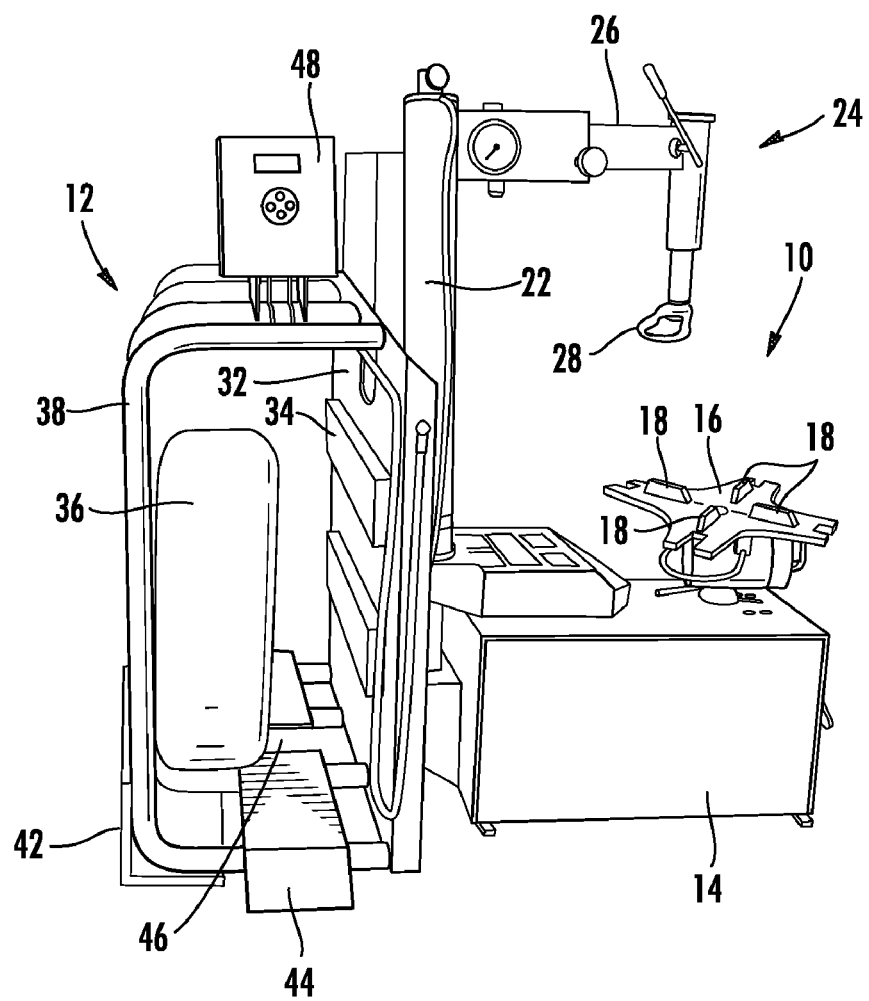
FIG. 1 is a left side perspective view of a tire changer with attached inflation cage in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are included in the exemplary embodiments.

The preferred embodiment will be described in relation to a rim holding style tire changer. In this regard, the structure and operation of a rim holding style tire changer device is described in detail in U.S. Pat. No. 6,182,736 to Cunningham et al., incorporated herein by reference in its entirety for all purposes. One skilled in the art will appreciate, however, that aspects of the present invention may be applicable to various other types of tire changers as well.

Figure 2:
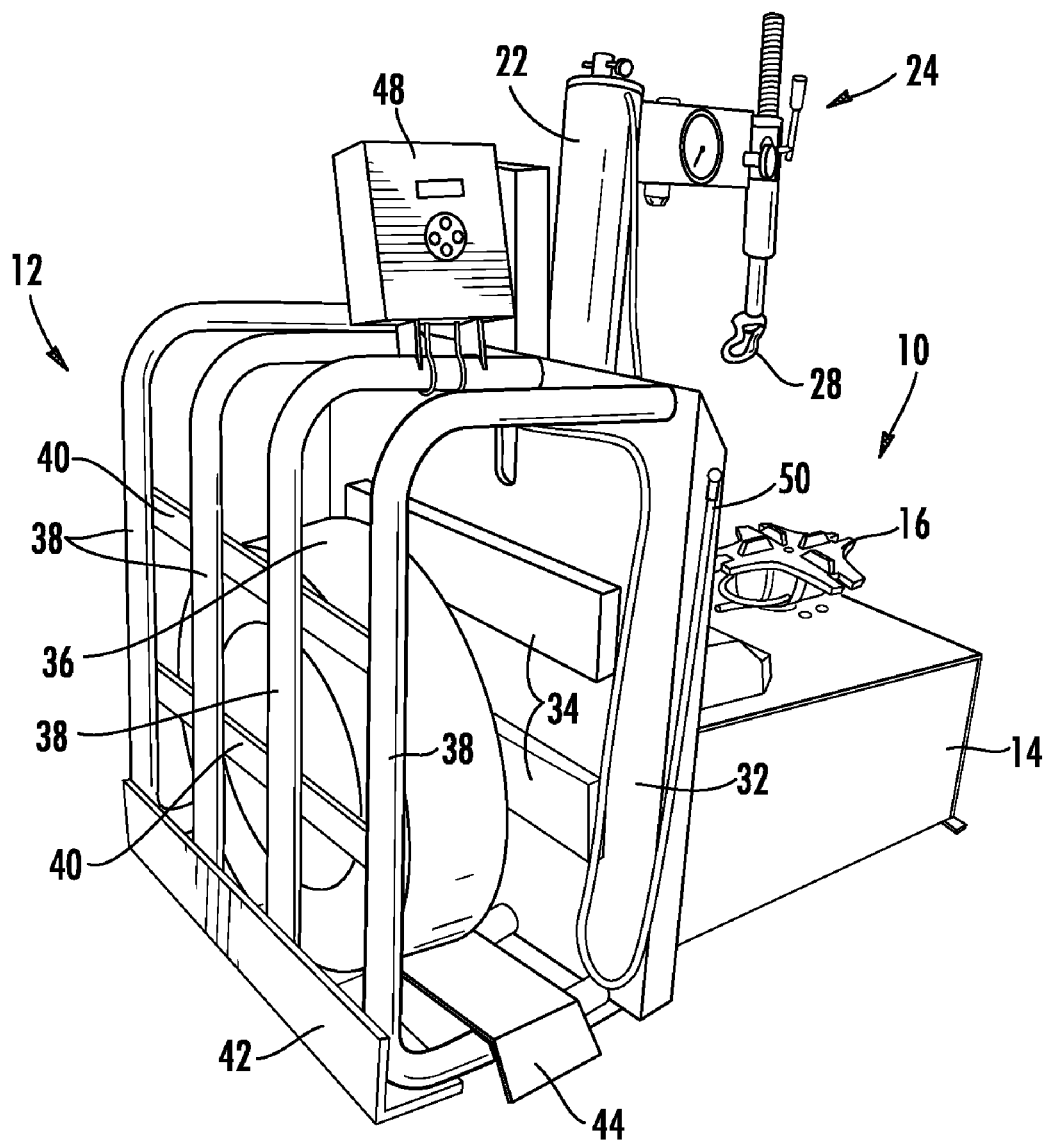
FIG. 2 is a rear perspective view of the tire changer of FIG. 1.
Figure 3:
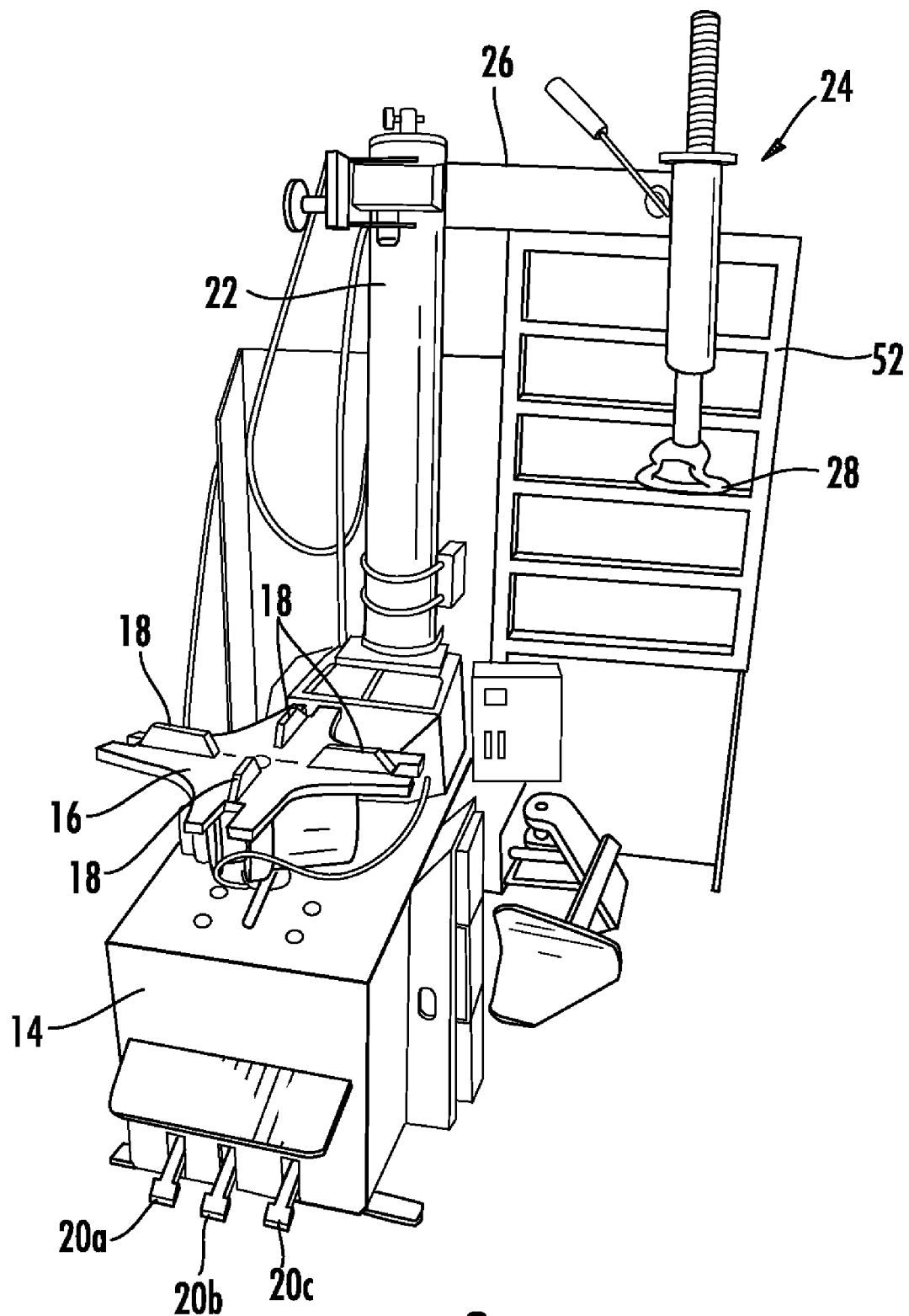
FIG. 3 is a front perspective view of the tire changer of FIG. 1.

Referring now to FIGS. 1-3, a rim holding style tire changer 10 including an attached inflation cage 12 in accordance with the present invention is illustrated. Tire changer 10 includes a base 14 in which a variety of internal mechanisms are located. A rotatable wheel holder, here in the form of a turntable 16, is located above the top of base 14 for supporting a vehicle wheel in a horizontal position for the tire changing operation. In this case, a pneumatic motor located inside of base 14 functions to rotate turntable 16.

Turntable 16 includes a plurality of jaws 18 that move radially into and out of engagement with the wheel rim. A series of foot pedals 20*a-c* (FIG. 3) are provided at the front of base 14 for use by the operator. Foot pedals 20*a-c* perform various functions, such as controlling rotation of turntable 16 and movement of jaws 18.

A vertical tower 22 extends up from the back of base 14. As shown, a mount/demount assembly 24 is located at the upper end of tower 22. Assembly 24 includes a pivotal swing arm 26 carrying a vertically movable toolhead 28 at its distal end. As a result, toolhead 28 may be moved from a position away from the wheel rim to a position adjacent to the wheel rim.

Figure 4:
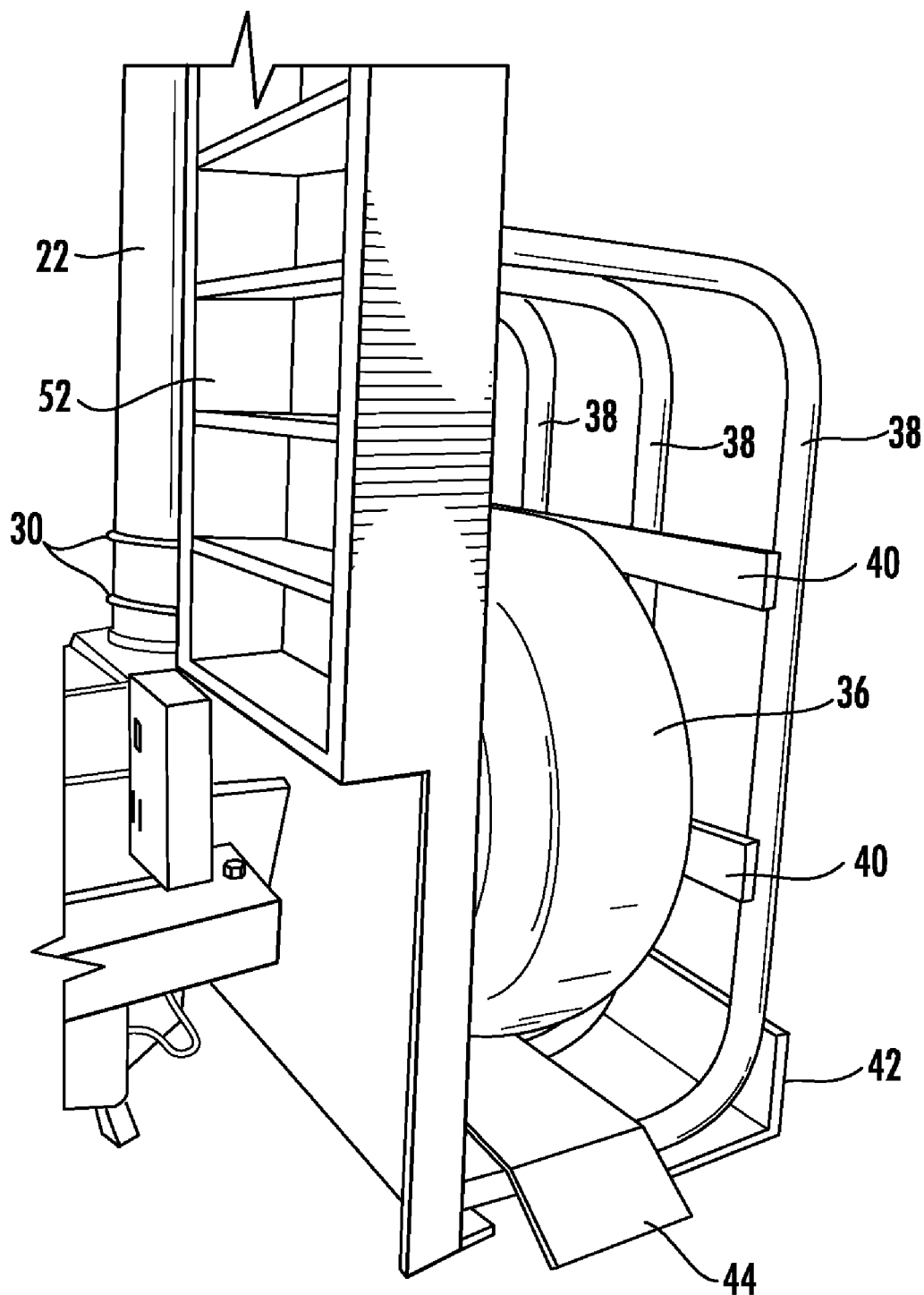
FIG. 4 is a right side perspective view of the inflation cage showing a shelf arrangement in accordance with an embodiment of the present invention.
Figure 5:
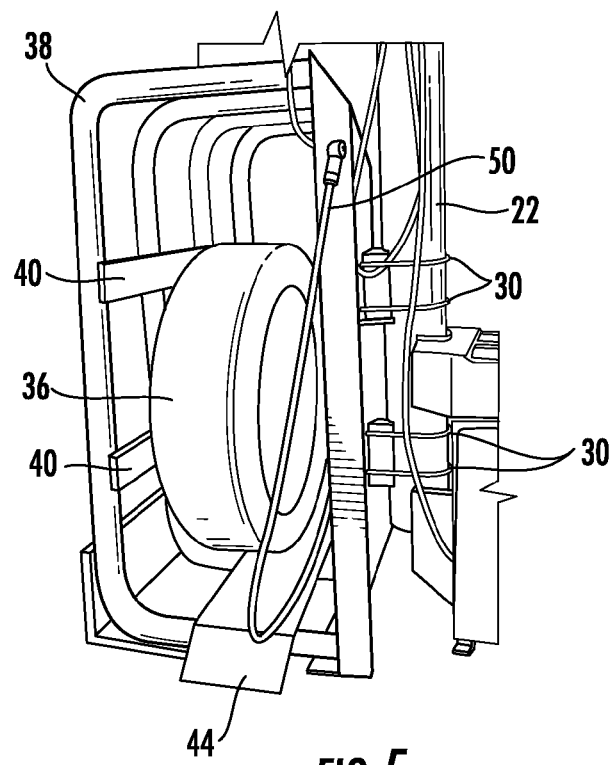
FIG. 5 is an enlarged perspective view showing the manner in which a wheel can be inserted into the interior of the inflation cage.
Figure 6:
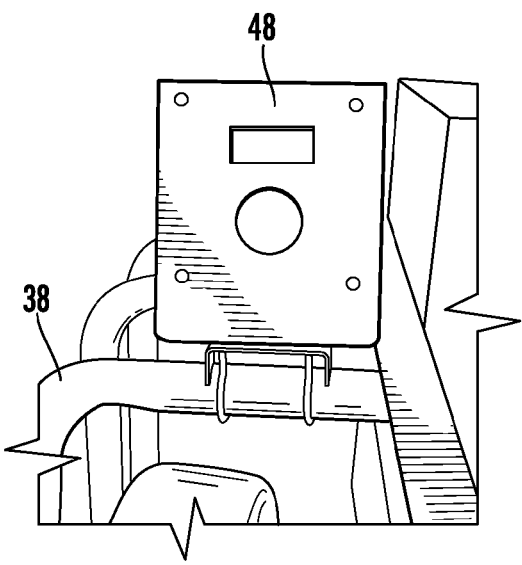
FIG. 6 is an enlarged front view of an automatic inflation device that may be used with the tire changer.
Figure 7:
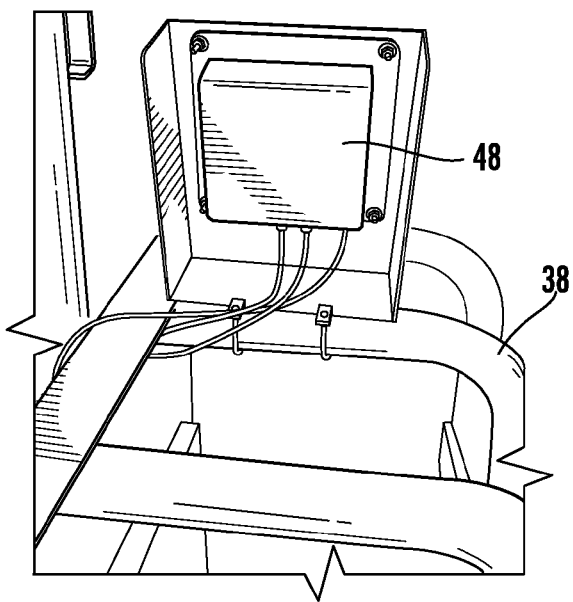
FIG. 7 is an enlarged back view of the automatic inflation device of FIG. 6.

Referring now also to FIGS. 4-6, inflation cage 12 is mechanically attached to, and maintained in position by, tire changer 10. In this case, a plurality of U-bolts 30 are used to connect cage 12 to tower 22 (FIG. 5). As one skilled in the art will appreciate, attaching cage 12 to tire changer 10 precludes the need to bolt the cage to a floor. This is because the weight of tire changer 10 prevents cage 12 from moving in the event of a tire explosion. Advantageously, inflation cage 12 can be attached to machines already in service as a retrofit.

As can be seen in FIG. 2, cage 12 in this embodiment includes a back panel (wall) 32 located adjacent to tower 22. A pair of spaced-apart rail structures 34 extend horizontally along back panel 32 as shown. Rail structures 34 assist in guiding a wheel 36 into the interior of cage 12 and also provides clearance for the ends of U-bolts 30. In this regard, apertures (not shown) may be defined in rail structures 34 to provide clearance for tightening U-bolts 30.

As shown, a plurality of bars 38 having a generally rectangular C-shape (i.e., the shape of a rectangle without one of the long sides) are attached to back panel 32 in a vertical orientation. In this embodiment, four such bars 38 are situated in a spaced apart arrangement to define the cage interior. Bars 38 may be attached to back panel 32 by welding or any other suitable technique. One or more spacer elements 40 may be attached across bars 38 in a horizontal orientation. A corner piece 42 may be attached at the outside bottom corner of cage 12 to provide a planar surface adjacent to the floor on which cage 12 rests. As one skilled in the art will appreciate, more or fewer vertical bars may be provided as necessary or desired. In addition, other suitable box-like structures may be used. All of these arrangements would be considered "cages" as that term is used in the present application.

Each open end of cage 12 is equipped with a ramp 44 to facilitate ingress and egress of wheel 36. Preferably, a gap 46 (FIG. 1) will be provided between ramps 44 in the middle of the cage interior to assure wheel 36 stays in this position when not being moved by the operator. Gap 46 will thus provide a detent between the ramps.

In the illustrated embodiment, an automatic inflation device 48 is also provided. As shown, the inflation device may be mounted to one of the bars 38 in a location convenient to the operator. Inflation device 48, which includes an inflation hose 50, automatically inflates wheel 36 to a pressure selectable by the operator.

As shown, a shelf arrangement 52 may be incorporated into cage 12 to provide additional storage for the operator. In this case, for example, a plurality of shelves are located on the side of back panel 32 opposite bars 38.

Because the inflation cage 12 is adjacent the tire changer, the operator can seal the tire on the machine using the bead sealing feature of the tire changer machine. Then, the tire can be placed in the inflation cage whereupon the automatic inflation device is attached to the tire valve for bead seating and final inflation. While the tire in the cage is being inflated, the operator has the opportunity to service a second tire. This flow of processes facilitates improved operator productivity.

Because the bars in the disclosed cage are vertical whereas inflation cages of the prior art had horizontal bars, it is assured that the tire will be at rest in the middle of the cage for inflation. This feature negates the need for other systems that require the operator to roll the tire up a ram system when near the middle of the cage. In addition, the described device is more economical than many of the existing products available to the trade.

It can be seen that the present invention provides a tire changer having an attached inflation cage. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the present invention. Therefore, it is contemplated that any and all such modifications are included in the present invention as may fall within the literal and equivalent scope of the appended claims.

What is claimed is:

1. A tire changing machine, comprising:
a chassis base;
a rotatable wheel holder configured to retain a wheel rim;
a tower extending upward from the chassis base, said tower carrying a mount/demount head moveable toward and away from the wheel rim; and
an inflation cage fixed with respect to said chassis base, said inflation cage defining an interior accessible through a first opening for ingress and egress of a vehicle wheel,
wherein said inflation cage is located at a back of said tire changer to rest on a common floor surface with said chassis base.

2. A tire changing machine as set forth in claim 1, wherein said inflation cage is attached to said tower.

3. A tire changing machine as set forth in claim 2, wherein said inflation cage is attached to said tower by a plurality of U-bolts extending around said tower.

4. A tire changing machine, comprising:
a chassis base;
a rotatable wheel holder configured to retain a wheel rim;
a tower extending upward from the chassis base, said tower carrying a mount/demount head moveable toward and away from the wheel rim; and
an inflation cage fixed with respect to said chassis base, said inflation cage defining an interior accessible through a first opening for ingress and egress of a vehicle wheel,
wherein said inflation cage has first and second openings at opposite ends thereof for ingress and egress of said vehicle wheel.

5. A tire changing machine as set forth in claim 4, wherein said inflation cage has first and second wheel ramps at said first and second openings, respectively.

6. A tire changing machine as set forth in claim 5, wherein said first and second wheel ramps are in alignment but a gap is defined therebetween to provide a rest position for said wheel.

7. A tire changing machine, comprising:
a chassis base;
a rotatable wheel holder configured to retain a wheel rim;
a tower extending upward from the chassis base, said tower carrying a mount/demount head moveable toward and away from the wheel rim; and
an inflation cage fixed with respect to said chassis base, said inflation cage defining an interior accessible through a first opening for ingress and egress of a vehicle wheel,
said inflation cage formed by a plurality of vertical bars spaced apart from one another,
wherein said vertical bars have a generally rectangular C-shaped configuration.

8. A tire changing machine as set forth in claim 7, wherein said plurality of vertical bars comprises four of said vertical bars.

9. A tire changing machine as set forth in claim 7, wherein said bars are attached to a back panel to define said interior.

10. A tire inflation cage for attachment to a tire changer machine, comprising:
a cage structure defining an interior in which a vehicle wheel is located during inflation, said interior being accessible through a first opening for ingress and egress of said vehicle wheel; and
an attachment mechanism positioned to attach said cage structure to said tire changer, wherein said attachment mechanism comprises a plurality of U-bolts configured to extend around a vertical tower of said tire changer.

11. A tire inflation cage for attachment to a tire changer machine, comprising:
a cage structure defining an interior in which a vehicle wheel is located during inflation, said interior being accessible through a first opening for ingress and egress of said vehicle wheel; and
an attachment mechanism positioned to attach said cage structure to said tire changer,
wherein said cage structure has a wheel ramp at said first opening.

12. A tire inflation cage for attachment to a tire changer machine, comprising:
a cage structure defining an interior in which a vehicle wheel is located during inflation, said interior being accessible through a first opening for ingress and egress of said vehicle wheel; and
an attachment mechanism positioned to attach said cage structure to said tire changer,
wherein said cage structure has first and second openings at opposite ends thereof for ingress and egress of said vehicle wheel.

13. A tire inflation cage as set forth in claim 12, wherein said cage structure has first and second wheel ramps at said first and second openings, respectively.

14. A tire inflation cage as set forth in claim 13, wherein said first and second wheel ramps are in alignment but a gap is defined therebetween to provide a rest position for said wheel.

15. A tire inflation cage for attachment to a tire changer machine, comprising:
a cage structure defining an interior in which a vehicle wheel is located during inflation, said interior being accessible through a first opening for ingress and egress of said vehicle wheel;
an attachment mechanism by which said cage structure is attached to said tire changer; and
said cage structure including a plurality of vertical bars spaced apart from one another, wherein said vertical bars have a generally rectangular C-shaped configuration.

16. A tire inflation cage as set forth in claim 15, wherein said plurality of vertical bars comprises four of said vertical bars.

17. A tire inflation cage as set forth in claim 15, wherein said structure further comprises a back panel, said bars being attached to said back panel to define said interior.

18. A tire inflation cage as set forth in claim 17, further comprising at least one shelf located on said back panel.

* * * * *